Aug. 5, 1969 L. J. TUMMERS ET AL 3,459,967

TRANSISTOR SWITCHING USING A TUNNEL DIODE

Filed Nov. 23, 1960

INVENTOR
LEONARD J. TUMMERS
ADRIANUS J. W. M. VAN OVERBEEK
BY
Frank R. Jeifari
AGENT 3,459,967

TRANSISTOR SWITCHING USING A TUNNEL DIODE

Leonard Johan Tummers and Adrianus Johannes Wilhelmus Marie van Overbeek, Eindhoven, Netherlands, assignors to North American Philips Company, Inc., New York, N.Y., a corporation of Delaware Filed Nov. 23, 1960, Ser. No. 71,344
Claims priority, application Netherlands, Dec. 11, 1959, 246,345
Int. Cl. H03k *17/58*
U.S. Cl. 307—258 8 Claims This invention relates to a circuit arrangement including a semi-conductor diode made of a material which has a relatively high concentration of charge carriers and a forward current-voltage characteristic including a negative resistance portion; the diode is biased in the forward direction by means of a resistor, so that it can assume either of two conditions in one of which the voltage across the diode is very small and in the other of which said voltage is larger by at least one order of magnitude.

Diodes having a forward current-voltage characteristic with a negative resistance portion are known from "Physical Review," vol. 109, p. 603, 1958.

Circuit arrangements of the above type were described in "Proceedings of the I.R.E." of July 1959, pp. 1201–1206, where the diodes used are termed "tunnel diodes."

A principal object of the present invention is to provide a circuit arrangement of this type, including in combination therewith a junction transistor which can be switched particularly rapidly and effectively from a blocked condition to a conductive condition and conversely by means of short pulses. The invention is based on the recognition of the fact that, in case of a forward base-emitter voltage equal to the very small voltage across a tunnel diode, most transistors are practically completely cut off, while it is possible to render the larger voltage across the tunnel diode so large, for example by choice of the series resistor and/or of the voltage of the bias voltage source, that a determined transistor is conductive but not bottomed in case of a corresponding forward base-emitter voltage.

The circuit arrangement according to the invention is characterized in that the tunnel diode is included in the base-emitter circuit of a junction transistor, and that control pulses are supplied to the diode which cause it to alternately assume its condition with very small voltage and its condition with the larger voltage; as a result of this the transistor alternately assumes a cut-off condition and a conductive condition.

In order that the invention may be readily carried into effect, it will now be described, by way of example, with reference to the accompanying drawing, in which FIG. 1 is a schematic diagram of a first embodiment of the circuit arrangement according to the invention.

Figures 1, 2:
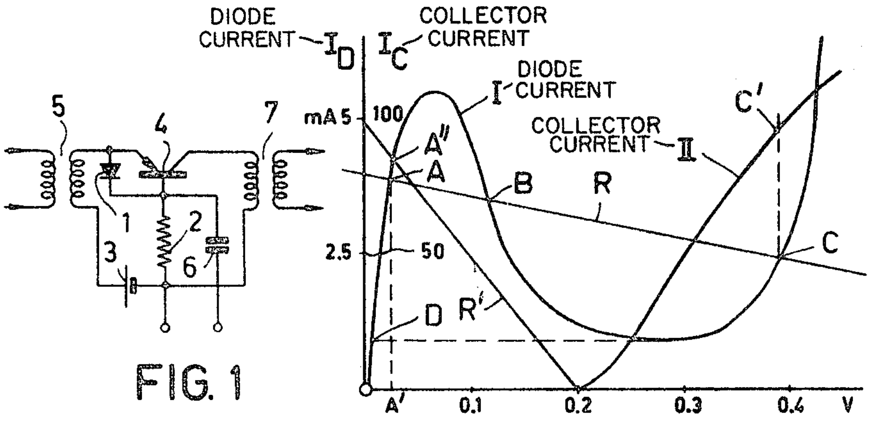
FIG. 2 is a characteristic diagram for explaining the mode of operation of this embodiment.

The first embodiment shown in FIG 1 includes in combination a so-called "tunnel" diode 1. A tunnel diode is a semi-conductor diode made of a material having a relatively high concentration of charge carriers. It has a forward current-voltage characteristic exhibiting a negative resistance portion, of the shape shown by the curve I in FIG. 2. The diode of FIG. 1 is biased in the forward direction by a battery 3 through a resistor 2. The voltage of the source 3 and the value of the resistor 2 are chosen so that the diode 1 can assume either of two stable conditions. As shown in FIG. 2 the load line R, for example =250Ω, intersects the current-voltage characteristic of the curve I in three points A, B and C. It can be shown that the condition of the diode 1 is stable at the points A and C and unstable at the point B. If the diode 1 is in the condition indicated by point A, the voltage across this diode is very small (for example 0.025 v.). If it is in its other stable condition C, the voltage across this diode is at least one order of magnitude larger; as shown in FIG. 2, the greater voltage is approximately 16 times larger (0.4 v.)

The diode 1 is connected in parallel with the emitter-base path of a transistor 4, for example of the PNP-type, the base of the transistor being directly connected to the electrode of the tunnel diode 1 which is of the same conductivity type and its emitter being connected to the other electrode of the diode 1. One end of the secondary winding of an input transformer 5 is connected between the emitter of the transistor 4 and the corresponding electrode of the diode 1, and the other end of the secondary winding is connected to the positive terminal of the voltage source 3; the latter may have a value of, for example, one volt. A source of control pulses is connected, via a capacitor 6, between the negative terminal of the voltage source 3 on the one hand and the base electrode of the transistor 4 and the corresponding electrode of the diode 1 on the other hand. The collector of the transistor 4 is connected to the negative terminal of the voltage source 3 through the primary winding of an output transformer 7.

The curve II of FIG. 2 shows the collector current of the transistor 4 as a function of its forward base-emitter voltage. It can be seen that, if the diode 1 is in its condition with very small voltage (point A), the transistor is practically entirely cut off (point A'), and cannot transmit input signals supplied to its emitter electrode via the input transformer 5 to the output of the circuit arrangement, via the output transformer 7. If a negative control pulse is supplied through the capacitor 6 to the base of the transistor 4 and the corresponding electrode of the diode 1, the operating point of the diode (provided the pulse has sufficient amplitude) is shifted to the right of the relative maximum of the curve I. As a result of the negative resistance of the diode 1, this operating point shifts of itself further to point C, passing through point B and along the curve I. The diode 1 is now in another stable condition, the voltage across this diode being approximately equal to 0.4 v. This voltage of 0.4 v. is also effective between the emitter and base electrodes of the transistor 4, which is consquently rather strongly conductive. For example, if the transistor 4 is of the OC 72 type, its collector current nearly equals 100 ma. In this condition the transistor 4 is conductive but not bottomed and transmits input signals, supplied to its emitter electrode via the transformer 5, to the output of the circuit arrangement, vie the transformer 7. The transistor thereby approximately operates with its maximum current amplification factor. The input signals can be of rather large amplitude (for example approximately 0.1 v. peak voltage) without risking the change over of the diode 1 back to its condition with very small voltage. In order to produce such a change-over, the input signals would have to shift the operating point of the diode 1 from point C to the left of the relative minimum of the curve I. The diode 1 is again changed over into its condition with very small voltage by a positive pulse having an amplitude larger than 0.12 v. applied to the base of the transistor 4 and to the corresponding electrode of the diode 1, via the capacitor 6.

By means of control pulses of alternate polarities, the diode 1 may be brought alternately into its conditions with very small voltage and with larger voltage. The transistor is thereby alternately brought into a cut-off condition and into a conductive condition, as explained above.

The control pulses of alternate polarities can also be supplied to the diode via the transformer 5 with the input signal being applied to the base of the transistor 4 via the capacitor 6.

Figure 3:
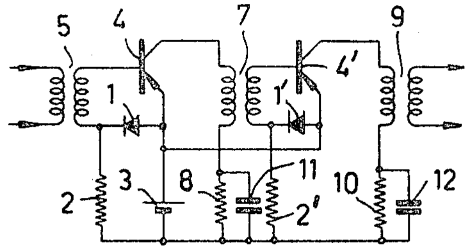
FIGS. 3, 4, 5 and 6 are schematic diagrams of four further embodiments.

The second embodiment, shown in FIG. 3, is a two-stage pulse divider. Negative control pulses are supplied to the base of a first transistor 4 via an input transformer 5 and pulses having a halved recurrence frequency are deriver from the collector circuit of this transistor; an output transformer 7 supplies the derived pulses to the base of a second transistor 4'. Output pulses having a recurrence frequency one-fourth as large are derived from the collector circuit of the transistor 4' by means of an output transformer 9. The series-combination of the secondary winding of the transformer 5 and of a first tunnel diode 1 is connected in parallel with the base-emitter path of the transistor 4. Via a resistor 2 of, for example, 250Ω, this diode is biased in the forward direction by a voltage source 3 of, for example, 1 v., which also supplies the collector voltage for the transistors 4 and 4'. The collector circuit of each of these transistors comprises the primary winding of the transformers 7 and 9, respectively, in series with resistors 8 and 10, respectively, shunted by capacitors 11 and 12, respectively. A second tunnel diode 1' shunts the series-combination of the emitter-base path of the transistor 4' and of the secondary winding of the transformer 7. This diode is also biased in the forward direction by the voltage source 3, via a resistor 2' of, for example, 250Ω.

If a negative pulse is supplied to the base of the transistor 4, for example a pulse having an amplitude of approximately 0.4 v. the loading edge of this pulse may change over the diode 1, or depending on whether the diode 1 is initially in its condition with very small voltage or in its condition with larger voltage. If the diode 1 is initially in its condition with larger voltage (operating point C of the diode and C' of the transistor, FIG. 2), the leading edge of this pulse is applied in reverse direction across the diode 1, via the base-emitter path of the transistor 4, so that this diode is switched into its condition with very small voltage (point A, FIG. 2) and the transistor is blocked after termination of the input pulse. The leading edge of the following pulse renders the transistor 4 conductive again and its trailing edge is applied in the forward direction across the diode via the base-emitter path of the transistor 4. The diode is thereby brought into its condition with larger voltage, so that the transistor 4 becomes conductive again, etc. The same holds also with respect to the second stage of the divider, including the transistor 4', the tunnel diode 1' and the transformers 7 and 9. The leading edge of each second negative pulse is applied to the base of the transistor 4 is transmitted to the base of transistor 4', and again each second pulse applied to the base produces a current pulse through the secondary winding of the output transformer 9.

Figure 4:
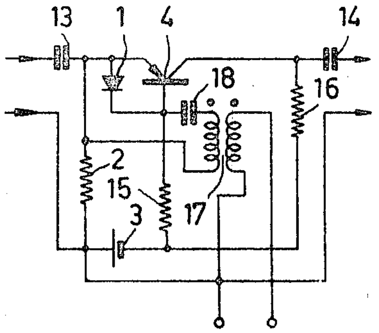

The third embodiment shown in FIG. 4 includes a transistor in grounded base arrangement, the emitter-collector parth of which is connected, in series with an input capacitor 13 and with an output capacitor 14, in the circuit of the transmission lead, so as to allow the interruption of this lead at will. A tunnel diode 1 is directly connected between the base-and emitter electrodes of the transistor 4, the electrodes of the tunnel diode being connected to the electrodes of the transistor having corresponding conductivity types. The emitter of the transistor 4 and the corresponding electrode of the diode 1 are connected to a source of forward voltage 3 via a resistor 2. The base of the transistor 4 is connected to the other terminal of this voltage source via a resistor 15, and its collector is connected to the same terminal via a load resistor 16. The secondary winding of a control transformer 17 in series with a capacitor 18 is connected across the diode 1 and pulses of different polarities are supplied to the primary winding of the transformer 17.

If a negative pulse is supplied to the base of the transistor 4 and to the corresponding electrode of the diode 1 via the transformer 17, the transistor is rendered conductive while the diode 1 is simultaneously brought into its condition with larger voltage. After termination of this pulse, the transistor thus remans in is conductive condition (operating point C' of FIG. 2) and signals supplied to its emitter via the capacitor 13 produce corresponding signals across its collector-load resistor 16, which signals are further transmitted via the output capacitor 14. These signals are also supplied to the diode 1, but only via the resistors 2 and 15, so that they cannot easily switch the diode from one condition A or C into the other. The pulses reaching the diode via the transformer 17 and the capacitor 18 are however directly effective across this diode and easily bring about the changing over of the diode 1. If a positive pulse is applied to the base of the transistor 4 via this transformer, the diode 1 is switched into its condition with very small voltage, the transformer 4 is blocked and the signals supplied to its emitter are no longer transmitted, since this transistor remains blocked in case of comparatively small amplitude of these signals (for example smaller than 0.2 v.).

Figure 5:
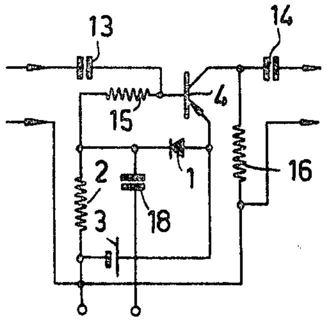

The fourth embodiment shown in FIG. 5 comprises a transistor in grounded emitter arrangement, the base-collector path of which in series with an input capacitor 13 and with an output capacitor 14 is connected in series in a transmission circuit. A tunnel diode 1, in series with a base-input resistor 15, is connected between the emitter of the transistor 4 and its base, electrodes of corresponding conductivity types being connected together. The emitter of the transistor 4 is directly connected to the positive terminal of a bias voltage source 3 and the common point of the resistor 15 and of the diode 1 is connected to the negative terminal of this source via a resistor 2. The collector of the transistor 4 is also connected to this negative terminal via a load resistor 16, and the common point of the diode 1, of the resistor 15 and of the resistor 2 is coupled to a source of control pulses by means of a capacitor 18.

The operation of the circuit arrangement shown in FIG. 5 is generally similar to that of the circuit arrangement shown in FIG. 4, with the difference that the transistor 4 is base-controlled by the incoming signals and consequently reproduces these signals amplified in its collector circuit (voltage amplification). The resistor 15 decouples the diode 1 with respect to the signals via the capacitor 13 and limits on the other hand the base current of the transistor 4, so that the latter can be maintained out of the bottomed condition.

Figure 6:
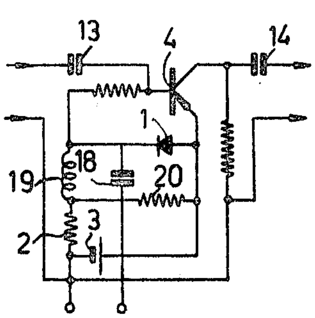

The fifth embodiment in FIG. 6 very much resembles the fourth embodiment shown in FIG. 5. However, in FIG. 6, an inductance 19 is connected in series with the resistor 2 and a resistor 20 is connected between the common point of the resistor 2 and of the inductance 19 on the one hand and the positive terminal of the voltage source 3 on the other hand. The resitors 2 and 20 consequently form a voltage divider, by which only a comparatively small voltage of, for example, 0.2 v. is applied across the diode 1. By the presence of the resistor 20, the load resistance of the diode 1 is reduced to a value of, for example, 40Ω, so that this diode now only has one stable operating point A'' on the load line R' (FIG. 2). The transistor 4 is thus normally blocked, since the voltage across the diode 1 and consequently also the voltage between its base and emitter electrodes is very small. If a negative pulse is supplied, via the capacitor 18, to the electrode of the diode 1 connected to the base of the transistor, this diode is driven to a point with larger voltage of its characteristic I, for example approximately to point C of FIG. 2, owing to the presence of the inductance 19. The larger voltage across the diode 1 gradually decreases after termination of the control pulse, in accordance with the time constant of the network including the inductance 19 and the resistors 2 and 20. As soon as the operating point of the diode reaches a point on the left of the relative minimum of the curve I of FIG. 2, the diode suddenly reassumes its condition with very small voltage, via point D (FIG. 2), thus ultimately point A'', since point D is not stable. The tunnel diode with the inductance 19, the resistors 2 and 20 and the voltage source 3 consequently operates as a monostable trigger and signals can only be transmitted via the capacitor 13, the transistor 4 and the capacitor 14 during the duration of the pulses of this trigger.

Figure 7:
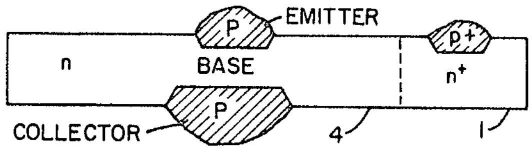
FIGURE 7 is a sectional elevational view of a device wherein the tunnel diode is included as a portion of the crystal of the transistor.

In the circuit arrangement shown in FIGS. 1 and 4, the base of the transistor 4 is directly connected to the corresponding electrode of the diode 1. In such cases, the diode 1 can possibly consist of a portion of the crystal of the transistor 4 having a higher concentration of charge carriers. Such an arrangement is shown diagrammatically in FIG. 7 wherein reference numeral 4 shows the transistor portion and reference numeral 1 the diode portion. The diode portion can optionally be provided with a separate contact and with a separate electrode connected thereto. In the circuit arrangements shown in FIGS. 1 and 4, such a separate electrode is not required, the emitter of the transmitter 4 being connected directly to the corresponding electrode of the diode 1. In the circuit arrangement shown in FIG. 3, however, the secondary winding of each of the transformers 5 and 7 might also be connected between the emitter of the transistors 4 and 4' and the corresponding electrodes of the diodes 1 and 1', respectively. As a result, it would be possible to use diodes comprising a portion of the crystal of the corresponding transistor, in which case a separate diode-electrode would be required.

The larger voltage across a tunnel diode generally amounts to only some tenths of a volt as shown in FIG. 2. In circuit arrangements according to the invention, it is consequently always possible to operate the transistor so that it is not bottomed by the voltage across the diode. This of course also depends on the collector voltage used and on the collector-load impedances, as well as on the resistor possibly included in the emitter lead.

The circuit arrangement described may be used in signal transmission devices, for example for telephony, or as logical circuit arrangements for example in computers or in any automatic system.

Although several specific embodiments of the invention have been shown and described, these are only illustrative and it is understood that various modifications may be made therein without departing from the spirit and scope of the invention as set forth in the appended claims.

What is claimed is:

1. An electrical circuit comprising: a two-terminal device whose volt-ampere characteristic has two regions of positive resistance separated by a region of negative resistance; an output terminal; a transistor connected in the common base configuration and having a collector-emitter path connected between said output terminal and one of the device terminals, and having a base electrode connected to the other terminal of said other terminal of said device and a point of reference potential; and means connected to said device for receiving input signal pulses.

2. A circuit arrangement comprising: a tunnel diode having two regions of opposite conductivity type and having a forward current voltage characteristic including two positive resistance portions separated by a negative resistance portion, an output terminal, a transistor having emitter, base and collector electrodes, said transistor having the collector electrode thereof connected to said output terminal and the emitter electrode thereof connected to one of said diode regions, means connecting the base electrode of said transistor to the other of said diode regions, means connecting an impedance element between said other diode region and a point of reference potential, and means connected to said tunnel diode for receiving input pulses.

3. A circuit arrangement according to claim 2, wherein said base and emitter electrodes comprise an input circuit for the transistor and said collector electrode comprises an output circuit for the transistor, means for applying an input signal to said input circuit, and means for deriving an output signal from said output circuit.

4. The circuit arrangement of claim 2, wherein the diode comprises a portion of the crystal of the transistor, said portion having a higher concentration of charge carriers than said transistors.

5. The circuit arrangement of claim 4, wherein said portion is provided with a separate contact which has a separate electrode connected thereto for connection to the emitter electrode of the transistor.

6. A monostable circuit comprising, in combination, a transistor having base, emitter, and collector electrodes; means for applying operating voltages to the transistor; a tunnel diode connected in parallel with the base-to-emitter diode of the transistor; a constant voltage source connected to the tunnel diode for quiescently biasing the tunnel diode to one of its positive resistance operating regions; and a source of input pulses connected to the tunnel diode for switching the diode to its other positive resistance operating region.

7. In combination, a transistor having emitter, collector and base electrodes; connections for applying an operating voltage between said emitter and collector electrodes; a tunnel diode connected in parallel with said emitter and base electrodes; a substantially constant voltage source for quiescently biasing said tunnel diode in the higher current region of its low voltage state; and means for applying an input pulse to said tunnel diode for switching the tunnel diode to the lower current region of its high voltage state.

8. A monostable circuit comprising, in combination, a transistor having base, emitter and collector electrodes; a tunnel diode connected in parallel with the base-to-emitter diode of the transistor; an inductor; a constant voltage source connected through said inductor to the tunnel diode for quiescent biasing the tunnel diode to one of its positive resistance operating regions; and a source of input pulses connected to the tunnel diode for switching the tunnel diode to its other positive resistance operating region.

No references cited.

ARTHUR GAUSS, Primary Examiner

JOHN ZAZWORSKY, Assistant Examiner

U.S. Cl. X.R.

307—253, 274, 286, 303

PO-1050
(5/69)

UNITED STATES PATENT OFFICE
CERTIFICATE OF CORRECTION

Patent No. 3,459,967 Dated 9/29/69

Inventor(s) Leonard Johan Tummers et al

It is certified that error appears in the above-identified patent and that said Letters Patent are hereby corrected as shown below:

Column 1, line 6, change "North American Philips Company, Inc. to --U.S. Philips Corporation--; Col. 3, line 10 change "river" to --rived--;

SIGNED AND
SEALED
JUL 21 1970

(SEAL)
Attest:

Edward M. Fletcher, Jr.
Attesting Officer

WILLIAM E. SCHUYLER, JR.
Commissioner of Patents